United States Patent [19]

Linder et al.

[11] Patent Number: 5,304,307
[45] Date of Patent: Apr. 19, 1994

[54] CHARGED ASYMMETRIC MOSAIC MEMBRANCES

[75] Inventors: Charles Linder, Rehovot; Mara Nemas, Neve Monoson; Mordechai Perry, Petach Tikva; Reuven Ketraro, Rishon Letzion, all of Israel

[73] Assignee: Aligena AG, Basel, Switzerland

[21] Appl. No.: 801,859

[22] Filed: Dec. 3, 1991

[30] Foreign Application Priority Data

Dec. 3, 1990 [GB] United Kingdom ............... 9026219

[51] Int. Cl.$^5$ .............................. B01D 13/00
[52] U.S. Cl. .................. 210/490; 210/500.27; 210/500.29; 210/500.34; 210/500.37; 210/500.38; 210/500.39; 210/500.4; 210/500.41; 210/500.43; 210/651
[58] Field of Search .......... 521/134; 210/490, 500.27, 210/500.29, 500.34, 500.37, 500.38, 500.39, 500.4, 500.41, 500.43, 651

[56] References Cited

U.S. PATENT DOCUMENTS

| | | | |
|---|---|---|---|
| 3,886,066 | 5/1975 | Chen et al. | 210/500.41 |
| 4,067,803 | 1/1978 | Quentin | 210/22 |
| 4,514,304 | 4/1985 | Miyaki et al. | 210/638 |
| 4,778,596 | 10/1988 | Linder et al. | 210/500.38 |
| 4,792,404 | 12/1988 | Swedo et al. | 210/654 |
| 4,992,221 | 2/1991 | Malon et al. | 210/500.27 |
| 5,024,765 | 6/1991 | Linder et al. | 210/651 |
| 5,049,282 | 9/1991 | Lindes et al. | 210/651 |

FOREIGN PATENT DOCUMENTS 2524870 12/1975 Fed. Rep. of Germany .
2166382 8/1973 France .
1423663 2/1976 United Kingdom .

OTHER PUBLICATIONS

"Journal of Membrane Science", 43(2/3), 205-216 (May 1989).
"Journal of Membrane Science", 54(1/2), 75-87 (Nov. 1990).

Primary Examiner—John Kight, III
Assistant Examiner—John M. Cooney, Jr.
Attorney, Agent, or Firm—Wenderoth, Lind & Ponack

[57] ABSTRACT

The present invention relates to semipermeable mosaic polymer membranes of asymmetric structure and with a macroscopic distribution of the mosaic-forming anionic and cationic charges (sites). The membranes can be prepared by casting a polymer solution of an optionally charged matrix-forming polymer and at least one precursor polymer, incompatible with the matrix-forming polymer, in a selected solvent, into a film, forming a skin on one side of the film, precipitating the skinned film to form the asymmetric membrane and charging it by chemical reactions to introduce or complete their mosaic structure. These membranes have good permeability for electrolytes, such as salts of mono- or polyvalent inorganic acids, while retaining low molecular weight organic solutes.

13 Claims, No Drawings

CHARGED ASYMMETRIC MOSAIC MEMBRANCES

BACKGROUND OF THE INVENTION

The present invention relates to semipermeable mosaic polymer membranes of asymmetric structure and with a macroscopic distribution of the mosaic-forming anionic and cationic charges (sites). These membranes have good permeability for electrolytes, such as salts of mono- or polyvalent inorganic acids, while retaining low molecular weight organic solutes.

The separation of mono-, di- or polyvalent salts, such as sodium chloride, or sodium sulfate or sodium triphosphate, from low molecular weight (MW<1000) organic compounds in (aqueous) solutions, via membranes is an important industrial separation problem which has not been economically solved. Membranes have been shown to offer an economical solution to many separation problems because of their ability to concentrate without a phase change, and to separate different solutes. The traditional membrane process of reverse osmosis (RO) rejects all salts and organics. The relatively newer membranes of selective reverse osmosis cannot efficiently achieve the above separations even though they are designed to pass salt and retain the organic solutes. The mode of separation in selective RO is based on size and electrostatic discrimination, and the proper choice of materials has not been found to give e.g. a sulfate passage. However, membrane structures containing separated macroscopic domains (0.05 to 100 microns) of anionic and cationic ion exchange materials connecting the opposite faces of the rejecting layer (called a charged mosaic membrane) have a built-in salt transport mechanism. They have been postulated and shown to give separation between organic solutes and salts. Under a pressure gradient the membranes preferential transport salt across the mosaic while retaining the organic solute [H. Kowatoh et al., Macro-molecules 21, 625–628, 1988].

Mosaic membranes have also been shown to give high water flux, while, at the same time, giving a permeate enriched in salt (F.B. Leitz, J. Shore, Office of Saline Water, Res. Developm. Program Report No. 775 (1972)].

Mosaic membranes are membranes with a macroscopic distribution of cationic and anionic sites. Typically, though not exclusively, they are arranged as particles, such as cationic and/or anionic particles distributed in a neutral matrix, or particles of one charge distributed in a matrix of the other charge. In this case, particles may be defined as regular or irregular approaching such shapes as spheres, multisided, fibers, cones, and others.

The different approaches to achieve the structures of mosaic membranes comprise such methods as the introduction of preformed particles in a matrix via resin suspension in a casting solution of the matrix, block or random copolymerisations, or phase separation in a common solvent (material incompatibility).

Mosaic membranes have not yet become commercially important in separation processes because of the difficulty in upscaling a reproduceable process for making mosaics. Of all the above approaches, one of the simplest with a good upscaling and fabrication potential is the said material incompatibility, or phase separation in a common solvent. However, it is also the most difficult to make without imperfections which destroy membrane properties.

Further, the known mosaic membranes do not have high enough rejection to low (less than 400) molecular weight solutes, or if they have high enough rejection their water fluxes are too low.

SUMMARY OF THE INVENTION

Surprisingly, it was found that if the wet film coating of polymers is such that it can be made into an asymmetric membrane by a process of coating, partial evaporation and then immersing in a gelling solvent, such as water, mosaic structures are formed without leaks or imperfections with good rejection to organic solutes and salt passage.

It is, therefore, a principal object of the present invention to provide asymmetric semipermeable mosaic membranes.

Other objects of the present invention are processes for the manufacture of the inventive membranes, as well as their use in separating organic, low molecular weight solutes from inorganic salts of mono- or polyvalent inorganic acids.

These and other objects of the present invention will become apparent from the following detailed description.

DETAILED DESCRIPTION

The present invention accordingly provides in its main aspect a semipermeable mosaic polymer membrane with a macroscopic distribution of the mosaic-forming anionic and cationic charges which comprises an asymmetric structure of a matrix of at least one optionally charged polymer and at least one charged polymer dispersed therein.

Asymmetric membranes are characterized by a thin dense upper layer (usually less than 5.0 microns but preferably less than 1.0 micron thick), which is the selective barrier extending continuously from a thicker (10 to 1000 microns) porous structure. The asymmetric structure is made simultaneously in the casting of a polymeric solution and gelling. The membranes of the present invention have the aforementioned asymmetric structure, but in addition contain a mosaic structure of ionic materials distributed within the upper discriminating layer. This mosaic structure confers upon the membrane the ability to pass salts by the mosaic mechanism of salt/water flow coupling.

Preferably, the inventive membranes comprise at least one optionally charged and matrix-forming polymer as major component and the at least one charged polymer dispersed therein as minor component. Essential embodiments of these membranes comprise at least one charged polymer dispersed in a matrix-forming polymer of opposite charge; or polymers of both charges that are dispersed in a neutral matrix-forming polymer or in a matrix-forming polymer of one or both charges. The term charges means that negative (anionic) or positive (cationic) charges, or both, are present in the polymers, such as in a preferred embodiment, which comprises a membrane with a dispersed polymer containing the cationic charges and a matrix-forming polymer containing the anionic charges.

As a rule, the dispersed polymers are present as regular or irregular particles of one or both charges within the matrix of opposite charge or of one or both charges.

Ideally, the size of the particle is such that it is large enough to penetrate from the uppermost surface through the active rejecting layer of the asymmetric layer, which is from about 0.01 to 5 microns thick.

Polymeric materials for the matrix can be chosen from materials which are film formers and/or can be cast into asymmetric membranes. Such materials can be chosen from cellulosics, polysulfones, polyethersulfones, polyetherketones, polyether-etherketones, polyether imides, polyphenylene oxides, polyphenylene sulfides, polyamides, polyimides, polyamide-imides, polycarbonates, polyacrylonitriles, polyethers, polybenzamidazole, and their derivatives, such as derivatives containing sulfonic or phosphoric acid groups. Of special interest are polymeric materials that can be cast into asymmetric membranes with cutoffs in the range of small organic molecules of a molecular weight less than 1000, and preferably between 150 and 700.

Preferred polymeric materials for achieving such performance are cellulose acetates, sulfonated polysulfones and polyether sulfones, or polyetherimides, polyamides, polyimides, polycarbonates, and sulfonated 2,6-dimethylphenylene oxides. Especially applicable because of their membrane forming properties, chemical stability, anionic charge and availability are sulfonated polysulfones and polyethersulfones.

Polymeric materials for the dispersed particles may be chosen from a broader range of materials than that which goes into making the matrix. The choice of materials is in part determined by how the minor component which forms the particles is introduced. The polymers that go into forming the particles can be chosen from those that may in another case form the matrix, with the condition that the polymers of the particle forming material are incompatible with the polymer which forms the matrix. Polymer compatibility/incompatibility is a well studied field [The Handbook of Solubility Parameters and other Cohesion Parameters by Allan F.M. Barton, CRC Press 1983] and the method is preferred because, by this approach, fine particles of the range of 0.05 to 10 microns are easily achieved.

Suitable charged polymers for the dispersed particles in the matrix structure can be inorganic or organic polymers that show the desired incompatibility with the matrix-forming polymers. Preferred are halomethylated-polyphenylene oxides, polyether sulfones, polysulfone or polystyrenes, each quaternated with tertiary amines; sulfonated and/or carboxylated polystyrenes, polysulfones or polyether sulfones, especially sulfonated polysulfones with ion-exchange capacities sufficiently different from the matrix materials to make the two incompatible (such as sulfonated polysulfones of 0.6 meq/g and 1.2 meq/g are incompatible).

Further suitable polymers are such on the basis of polydialkyl(dimethyl)siloxanes, such as polydimethylsiloxanes containing in addition e.g. groups that can be charged with amino or halogen compounds, such as vinyl methyl, (acyloxypropyl)methyl, (aminopropyl)methyl, (chloromethylphenethyl)methyl, chloropropyl(methyl), (epoxycyclohexylethyl)methyl, or (mercaptopropyl)methyl pendants attached to the silicone atoms, as homo- or copolymers with polydimethyl siloxanes.

Especially preferred are halomethylated 2,6-polyphenylene oxides, polysulfones or polyether sulfones, quaternated with tertiary amines.

The inventive semipermeable asymmetric mosaic polymer membranes can be prepared by a process which comprises (a) forming a polymer phase of an optionally charged matrix-forming polymer and at least one precursor polymer, incompatible with the matrix-forming polymer, by mixing solutions of the two polymers in a common solvent or solvent mixture or different solvents or their mixtures to get a casting solution, (b) casting a film of said solution, (c) forming on one side of said film a skin, (d) effecting precipitation of the skinned film to form asymmetric membranes, (e) charging them by chemical reactions to introduce or complete their mosaic structure, and (f) optionally crosslinking either the matrix and/or the precursor polymer.

The inventive process for preparing the asymmetric mosaic membranes may comprise such embodiments wherein in step (a) the matrix-forming polymer is the major polymer component and the precursor polymer is the minor polymer component to be mixed from their corresponding solutions in a common or different solvent or solvent mixtures to get a casting solution; the matrix-forming polymer and the precursor polymers are neutral or of the same charges; the matrix-forming polymer is neutral or of one or both charges and the precursor polymers are neutral; the matrix-forming polymer and one precursor polymer are of the same charge and optionally incompatible with each other, and a second precursor polymer is neutral.

A further embodiment of the inventive process comprises forming a polymer phase of a neutral matrix-forming polymer and two different precursor polymers which are incompatible with the matrix-forming polymer and each other by mixing solutions of the polymers in a common solvent or solvent mixture or different solvents or solvent mixtures to get a casting solution, casting a film of said solution, forming on one side of said film a skin, effecting precipitation of the skinned film to form asymmetric membranes, and charging them by chemical reactions to introduce anionic and cationic charges.

More particularly, for making the inventive membranes and introducing the precursor polymers as the particles into the membrane, these polymers can be dissolved in the solvents (solvent mixtures) common or different to the matrix polymers. After the membranes are formed with the said particles, the particles are quaternized with tertiary amines. In this case, the matrix material is chosen to be anionic, such as sulfonated polysulfones. Then the halomethylated polymer solution is added to the solution of the sulfonates polysulfone, the large difference in the physics-chemical properties of the polymers causes the minor component (halomethylated polymer) to precipitate. If the quaternized polymers were added instead of its halomethylated precursor, then the cationic and anionic sulfonated polymer would precipitate together and a membrane could not be formed.

As described, the incompatibility may manifest itself in the casting solution; in effect, when the solution of one of the minor polymer components are mixed in the presence of another polymer, the minor polymer precipitates out in the casting solution as separated particles.

Alternatively, this incompatibility may occur during the evaporation stage when the top surface of the wet film is densified prior to coagulation in the process of making asymmetric membranes. The particles may also be formed during the coagulation step. Surfactants, emulsifiers, and stability/compatibility agents may be added to the casting solution in order to improve the stability between the particles and the matrix being incompatible to each other.

The basic principles for making asymmetric membranes are known in the literature. Membrane casting may be performed by casting procedures cited in the patent literature, for example in U.S. Pat. No. 4,029,582, GB-A-2,000,720, U.S. U.S. Pat. No. 3,556,305, U.S. Pat. No. 3,615,024, U.S. Pat. No. 3,567,810, or CA-A-1,234,461; further in Desalination 36, 39–62 (1981). Thus, the polymer or its derivatives may be dissolved in a suitable solvent or mixture of solvents (for example N-methylpyrrolidone (NMP), dimethylformamide (DMF), dimethylsulfoxide (DMSO), hexamethylphosphortriamide, N,N-dimethylacetamide (DMCA), dioxane), which may or may not contain co-solvents, partial tetrahydrofuran solvents, non-solvents, salts, surfactants or electrolytes for altering or modifying the membrane morphology and its flux and rejection properties (i.e. acetone, ethanol, reethanol, formamide, water, methylethylketone, triethyl phosphate; sulfuric acid, hydrochloric acid; organic acids, preferably of low molecular weight such as formic, acetic or lactic acid; surfactants and emulsifiers of the group of e.g. partial esters of fatty acids and sugar alcohols or their ethylene oxide adducts, e.g. polyoxyalkylated fatty acid partial esters of polyhydric alcohols, such as polyoxyethylone sorbitan tristearates or polyoxyethylene sorbitan trioleates; polyhydric alcohol fatty acid esters such as sorbitan monolaurate, -monpalmitate, -monostearate, -monooleate, -tri-stearate or -trioleate; sodium dodecyl sulfate; fatty acid amides, such as coconut fatty acid diethanol amine adducts; or alkylphenol polyglykolethers, sodium dodecyl sulfate (SDS), or sodium dodecylbenzene sulfonate; sodium hydroxide, potassium chloride, zinc chloride, calcium chloride, lithium nitrate, lithium chloride, magnesium perchlorate, etc.

The casting solution may be filtered by any of the known processes (i.e., pressure filtration through microporous filters or by centrifugation), and cast on a support, such as e.g. glass, metal, paper or plastic, from which it may then be removed. It is preferred, however, to cast on a porous support material from which the membrane is not removed. Such porous supports may be non-woven or woven clothes, such as cellulosic derivatives, polyethylenes, polypropylenes, polyamides (nylon), polyvinyl chlorides and its copolymers, polystyrenes, polyethylene terephthalates (polyesters), polyvinylidene fluorides, polytetrafluoroethylenes, polyether ketones, glass fibers, porous carbon, graphite, inorganic membranes based on alumina and/or silica, optionally coated with zirconium oxide or other oxides, or ceramics. The membrane may alternatively be formed as flat sheet or as a hollow fiber or tubelet.

The concentration of polymer in the casting solution may vary as a function of its molecular weight and of the further additives between 5 to 80%, but preferably between 10 and 50% and most preferred between 15 to 30%. The temperature of casting may vary from −20° to 100° C., but the preferred range is between 0 and 60° C., varying as a function of the polymer, its molecular weight and the cosolvents and additives in the casting solutions.

The polymer casting solution may be applied to the above mentioned supports by any of the well known techniques, known to those skilled in the art (step b).

The wet film thickness may vary between 15 microns to 5 mm, the preferred range being 50 to 800 microns and the most preferred 50 to 400 microns, especially for flat membranes; tubelets may, of course, have thicker walls. The wet film and support may then be immersed immediately or, after a partial evaporation step (from 5 seconds to 48 hours), at ambient conditions or elevated temperatures, or vacuum or any combination thereof (step c) into a gelling bath of a non-solvent (step d).

The partial evaporation of the solvent or solvent mixture may be carried out by exposing one side of the wet film to gas or air at temperatures in the range of from −10° C. to 130° C., preferably 0° C. to 100° C.

It appears that the process of evaporation of the top layer followed by a rapid immersion into a gelling bath gives an asymmetric structure wherein particles of the minor polymer are dispersed in the membrane matrix. In some cases, asymmetric membranes may be formed without the evaporation step.

Such baths are usually water or water with a small percentage of a solvent (for example DMF or NMP) and/or a surfactant (for example sodium dodecyl sulfate and/or (watersoluble) salts such as sodium chloride, sodium nitrate, calcium chloride and others) at a temperature of 0° to 70° C. An example of a commonly used gelling bath is water with 0.5% SDS at 40° C. In another mode of forming membranes, a polymer solution containing a component that may be leached out in water or another solvent is cast and dried before immersion. After immersion, leachable material is removed, resulting in a porous membrane. In a third variation, a polymer solution without any leachable materials is cast and taken to dryness, resulting in a porous membrane by virtue of the physicochemical properties of polymeric material—solvent combination or by a subsequent chemical reaction that creates pores.

While the above procedures are general, the asymmetric membrane should be cast in such a way that it has the desired molecular weight cut-off.

Ultrafiltration (UF) membranes with cutoffs of 1500 Daltons or more are easily prepared by state of the art methods. Such UF-membranes may be made into mosaics as described above, but are of limited value because these membranes pass salt without the need for a mosaic pathway. Most mosaic membranes will be needed with membranes that reject organic solutes with molecular weights of less than about 500, because such membranes begin to reject mono- and divalent salts. Asymmetric membranes with cutoffs of less than 1000 and especially between 150 and 700 are difficult to make, and very few materials have been cast with cutoffs in this range. The preferred polymers for achieving said performance have been mentioned hereinbefore.

The sulfonated polysulfones and polyethersulfones give particularly good results. In the case of sulfonated polysulfones, solvent mixtures of THF, water, DMAC, DMF, NMP, DMSO, dioxane can give good asymmetric membranes with molecular weight cutoffs below 500. These solvent mixtures are also suitable because they allow the formation of particles of the minor component in the asymmetric membrane matrix.

After membrane formation chemical treatments are established in order to introduce charges into the dispersed particles and/or the matrix for forming or completing the mosaic structure within the asymmetric membrane (step e).

In optional step (f) of the process for preparing the inventive mosaic membranes either the matrix and/or the precursor polymers (particles) may be cross-linked.

Such a cross-linking step is useful to decrease swelling of the inventive membranes, and, thus, improves the rejection to organic solvents.

Crosslinking of the halomethylated polymers, for example, can be brought about with di- or polyprimary, secondary or tertiary amines on alkyl or aromatic moieties. Di-tertiary amines can be used to both charge and crosslink. In all cases, the di- or polyamines can be added together with the mono tertiary amines, or before or after the quaternization step.

Polyamines may be monomers with more than two amino groups, or they may be polymers, such as polyethyleneimines or polyallylamines.

Cationic and anionic polymers cannot be mixed together without special precautions in a solution because they interact and precipitate and the resultant gelatinous mass cannot be cast into a membrane. Since the final membrane must contain both cationic and anionic areas, one or both of the charges must be formed after the membrane has been formed. Preferred precursors are haloalkylated polymers. Where the alkyl may be chosen from methyl, ethyl, propyl, butyl, pentyl, hexyl and further alkyls up to 12 carbon atoms, straight chained or branched, the halogen may be Cl, Br or J. From the point of view of ease of preparation, bromomethylated polymers are preferred. The polymers that are preferred are halomethylated 2,6-dimethyl polyphenylene oxide or halomethylated polysulfone.

After the membrane is formed, the halomethylated groups are converted into quaternary phosphonium, sulfonium or preferably ammonium groups, the latter by reaction with solutions containing tertiary alkyl amines, whereas the alkyl groups may contain 1 to 12, preferably 1 to 4 carbon atoms. Most preferred are methyl and ethyl. The conditions of reaction are known from the state of the art.

Other precursor polymers which finally form amino or quaternary ammonium salts are polyvinyl halides when reacted with amines; or amino group-containing polyolefins or polyaromatics which are converted to amides or exist as phthalimides and are then hydrolyzed back to the amines after the membrane is formed. Other amino-blocking groups may be used similarly.

Precursor anionic polymers may be carboxyl or/and sulfonic acid groups containing olefinic or aromatic backbones, which are in their ester form. Once the membranes are formed, the esters are hydrolyzed to give the fixed anionic group.

The precursor polymers may be used for forming either the particles or the membrane matrix, but if they are used as the major component to form the membrane, they must be a film former and be able to be cast into an asymmetric membrane with the desired cutoff. In addition, the chosen precursor should be incompatible with the other polymer.

As preferred combinations to prepare the inventive asymmetric membranes sulfonated polysulfone as the matrix-forming polymer, in which the sulfonic content is between 0.05 to 1.2 meq/g of polymer, preferably 0.6 to 0.8 meq/g can be used. The particle forming polymers are bromomethylated polyphenylene oxide with an active bromo content of 0.5 to 5.0 meq/g, but preferably 2.5 to 3.5 meq/g.

The sulfonated polysulfone is dissolved in a solvent such as dioxane, or tetrahydrofuran (THF) at a level of 5 to 50%, but preferably 15 to 30%. To this solution other components which may be added are water, NMP, DMA, DMF, DMSO, sulfolane, methanol, ethanol mono- and divalent salts, surfactants and/or emulsifiers in concentrations from 0.05 to 200% of the polymer, preferably from 1.0 to 50% of the polymer.

Other preferred combinations are e.g. sulfonated polyether sulfones and bromomethylated polyphenylene oxides; and sulfonated polysulfones or polyethersulfones together with bromo- or chloromethylated polysulfones.

Further, matrix-forming polymer containing a relatively low quantity of sulfonic groups, as, for example, 0.5 to 0.7 meq/g with a smaller quantity of a sulfonated polymer containing a relatively high concentration of sulfonic groups (1.2 meq/g), such that the two different polymers are incompatible even though they both contain sulfonic groups, can be used. Both sulfonated polymers would also be incompatible with the bromomethylated polymer. The resultant asymmetric membrane would thus contain particles of the highly sulfonated polymer and cationic particles made from the bromomethylated polymer in a matrix of the sulfonated polysulfone of lower ion exchange capacity (IEC).

The inventive membranes are useful for separating organic compounds of low molecular weight from aqueous inorganic salts containing solutions. The corresponding method for separating these compounds from said aqueous media, which comprises disposing the solutions on one side of a semipermeable composite membrane and filtering them through the membrane by applying a hydraulic pressure against said solutions and said membrane being greater than the osmotic pressure of said solutions, is a further object of the present invention.

The molecular weight range of the organic compounds to be separated (cut-off level of the inventive membranes) may be less than about 1000, preferably between about 150 and 700.

The inorganic salts present in the solutions, which are subjected to the membrane treatment (reverse osmosis), are preferably alkali metal salts of mono- or polyvalent inorganic acids, such as alkali metal halides or sulfates, e.g. sodium chloride and sodium sulfate.

The inventive membranes are very suitable for membrane separating processes, especially reverse osmosis processes. They can be prepared and used as flat in plate and frame devices or spiral wound elements, hollow fibers or tubular membranes in corresponding separation devices, such as modules. They have superior rejection to organic compounds of low molecular weight, good flux properties, superior flexibility, to chemical and/or biological degradation.

These membranes are especially useful for recovering organic compounds of low molecular weight from chemical reaction solutions or from waste water. These compounds can then be reused or disposed if toxic or dangerous.

The separation effect (the rejection) of the inventive membranes can be measured as follows: a circular membrane with a surface area of 13 cm$^2$, resting on a sintered stainless steel disc, is used in a cylindrical cell made of stainless steel. 150 ml of the solution (to be tested), which contains the substance to be tested in the concentration $C_1$ (g of substance per g of solution), are introduced onto the membrane in the steel cylinder and, using nitrogen, subjected to pressure of 40 bars. The solution is stirred magnetically. The liquid which collects on the outlet side of the membrane is examined to determine its content (concentration) $C_2$ of the substance to be tested, 3 samples of 5 ml each being taken from the start of the experiment. In general, the amount which flows through the membrane and the composition of the 3 samples are constant. The rejection can be calculated from the values obtained, using the equation:

$$R = \frac{C_1 - C_2}{C_1} \cdot 100 \, (\%)$$

The amount of the material passed through the membrane per surface and time is found to be:
$F = V.S^{-1}.t^{-1}$ V: Volume S: membrane surface area t: time F is approximately expressed in $m^3/m^2.d$, i.e. the number of cubic meters per square meter surface area of the membrane and per day, or in $1/m^2.h$, i.e. liters per square meter surface area of the membrane per hour.

In addition to the measurements on flat membranes, measurements on tubular membranes 60 cm long and with an outer diameter of 1.4 cm are also carried out. For this purpose, these tubular membranes are placed in a perforated tube made of stainless steel. The whole is placed in a tube made of polycarbonate. The outflow from the membrane is between this outer polycarbonate tube and the steel tube. The liquid is added as a stream of the solution in turbulent or laminar flow under pressure. The flow rate is kept constant at 10 to 15 liters per minute. The rejection (R) and the flux (F) are calculated in the same way as for the flat membranes.

In the following examples parts and percentages are by weight, if not otherwise indicated. The temperatures are in degrees Centigrade.

EXAMPLE 1

8 g of sulfonated polysulfone (PSU-SO$_3$H) (0.9 meq/g sulfonic acid groups in free acid form, ion exchange capacity—IEC)) is dissolved in 22 ml of dioxane and 3.2 ml of water. Separately 3.4 9 of bromomethylated polyphenylene oxide (PPO-Br) (Br content 4 meq/g) is dissolved in 12 ml of dioxane. Both solutions are mixed and stirred well with a mechanical stirrer.

From the above solution a wet film is cast on glass 0.4 mm thick, evaporated for 9 minutes at RT (23° C.) and gelled in water. The obtained asymmetric membrane is charged in a 10% aqueous solution of trimethylamine (TMA) for 24 hours. The membrane's flux s 1000 $1/m^2$.d at 30 bar for a 5% Na$_2$SO$_4$ solution, with a sulfate rejection of 21% and a rejection to dinitrostilbene sulfonic acid (DNS) (using a 1% DNS solution) of 99.8%.

If not otherwise indicated the testing solutions used hereinafter contain 2 to 5% of sodium sulfate or 1% of DNS. When using mixed solutions, they contain 0.5% of DNS and 2% of sodium sulfate. The tests are carried out at room temperature and at 30 to 40 bar.

EXAMPLE 2

Solutions of 8 g PSU-SO$_3$H (0.9 meq/g) in 24 ml of dioxane, and 2.5 g of PPO-Br (4 meq/g) in 12 ml of dimethylacetamide are prepared. The two solutions are mixed, and 0.1 ml of an octyl alcohol ethylene oxide adduct is added to the casting solution and stirred well. After casting a 0.4 mm wet film, this is heated for 5 minutes at 90° C. to evaporate some solvent, gelled and quaternized in TMA according to Example 1. The membrane has a water flux of 136 $1/m^2$.d, a sulfate rejection of 10.4% and a rejection to DNS of 99.2%.

EXAMPLE 3

Example 2 is repeated with 5.3 g of PSU-SO$_3$H (0.65 meq/g) and 2.5 g of PPO-Br (4 meq/g). The wet cast membrane film is heated for 3 minutes at 90° C. for partial solvent evaporation. The membrane has a water flux of 1120 $1/m^2$.d, a sulfate rejection of 33% and a rejection to DNS of 99.5%.

EXAMPLE 4

Example 3 is repeated with 5.3 g of PSU-SO$_3$H (0.65 meq/g) and 5 g of PPO-Br (8 meq/g). The wet cast membrane film is heated for 5 minutes at 90° C. for partial solvent evaporation. The membrane has a water flux of 166 $1/m^2$.d, a sulfate rejection of 15% and a rejection to DNS of 98.7%.

EXAMPLE 5

8 g of PSU-SO$_3$H (0.71 meq/g) are dissolved in 24 ml of dioxane, 1 g of PPU-SO$_3$H (1.2 meq/g) is dissolved in 5 ml of dimethylacetamide (DMCA) and 3.4 g of PPO-BR are dissolved in 10 ml of DMCA.

All three solutions are mixed and stirred well with a mechanical stirrer. From the obtained solution a 0.4 mm wet film is cast on glass, evaporated for 9 minutes at room temperature, and then gelled in water to form an asymmetric membrane. The membrane is charged in a 10% aqueous solution of TMA for 24 hours.

The membrane has a water flux of 373 $1/m^2$.d, a sulfate rejection of 43%, and a rejection to DNS of 99.3%.

EXAMPLE 6

4 g of PPU-SO$_3$H are dissolved in 24 ml of DMAC and 2 g PPO-BR are dissolved in 12 ml of dioxane. Both solutions are mixed and stirred well with a mechanical stirrer. From the obtained solutions a 0.4 Mm wet film is cast on glass, dried for 12 minutes at 90° C. and gelled in water to form an asymmetric membrane. This membrane is then charged in a 10% aqueous solution of TMA for 24 hours.

The membrane has a water flux of 1300 $1/1 \, m^2$.d, a sulfate rejection of 17%, and a rejection to DNS of 92%.

EXAMPLE 7

8 g of PSU-SO$_3$H are dissolved in 29 ml of dioxane and 2 g of PSU-CH$_2$Br are dissolved in 10 ml of DMAC. Both solutions are mixed and stirred well with a mechanical stirrer. From the obtained solution a 0.4 mm wet film is cast on glass, dried for 4 minutes at 90° C., and gelled in water to form an asymmetric membrane. This membrane is then charged in a 10% aqueous solution of TMA for 24 hours.

The membrane has a water flux of 120 $1/m^2$.d, a sulfate rejection of 45%, and a rejection to DNS of 98%.

EXAMPLE 8

Example 7 is repeated by using 3 g of a brominated polyvinyltoluene instead of PSU-CH$_2$Br. The results obtained are: a water flux of 950 1/m$^2$.d, a sulfate rejection of 20% and a rejection to DNS of 82%.

EXAMPLE 9

Example 2 is repeated with other neutral surfactants:

|  | Flux (1/m$^2$.d) | Rejection (%) sulfate | DNS |
| --- | --- | --- | --- |
| (a) polyoxyethylene sorbitanmonooleate | 600 | 40 | 99.5 |
| (b) nonylphenol polyglakolether | 900 | 33 | 99.5 |
| (c) coconut fatty acid-diethanolamine adduct | 800 | 27.5 | 98.6 |

EXAMPLE 10

Example 1 is repeated by using tetrahydrofuran (THF) instead of dioxane as solvent. The cast wet film is evaporated for 5 minutes at room temperature.

The resultant membrane has a water flux of 1200 1/m$^2$.d, a sulfate rejection of 10%, and a rejection to DNS of 99%.

EXAMPLE 11

Example 1 is repeated by using THF instead of dioxane as solvent. To the combined solutions 2 ml of DMCA is added.

From the casting solution a wet film is bobcast on a tubular polyester support. After an evaporation time of 7 minutes at room temperature, the film is gelled in water and the obtained asymmetric membrane is then charged with TMA as in Example 1.

The resultant membrane has a water flux of 800 1/m$^2$.d, a sulfate rejection of 5%, and a rejection to DNS of 99%. A scanning electron microscope picture of the membrane surface and cross-section shows uniformly dispersed particles.

When a mixture of an aqueous solution containing 5% of the dye of the formula

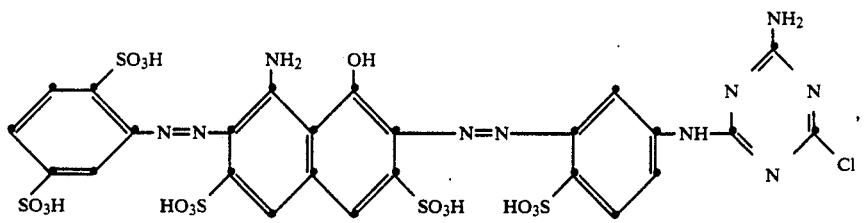

0.5% of sodium sulfate and 0.5% of sodium chloride are measured with the membrane of this example, the rejection to the dye is 99%, while the rejections to sulfate are 5% and chloride less than 10%, respectively.

EXAMPLE 12

A THF/DMAC/H$_2$O (36/3/4/v/v/v) solution containing 10 g of PSU-SO$_3$H (0.8 meq/g), 4.25 9 of PPO-BR (3.5 meq/g) and 0.2 ml of a coconut fatty acid-diethanolamine adduct as surfactant is cast on a glass and further prepared into an asymmetric membrane according to Example 1.

The resultant membrane has a water flux of 750 1/m$^2$.d, a sulfate rejection of 0% and a rejection to DNS of 97%.

EXAMPLE 13

Example 12 is repeated. When the wet film is cast on glass, evaporated and gelled in water, the asymmetric membrane is charged in an aqueous solution containing 10% of TMA and 2% of diaminopropane for 24 hours. Thus, in one step, the PPO-BR areas are quaternized and cross-linked. The resultant membrane has a rejection to DNS of 99% and 8% rejection to sulfate, with a flux of 630 1/m$^2$.d.

EXAMPLE 14

A casting solution formulation comprising 6.0 g PSU-SO$_3$H (IEC 0.8 meq/g), 2.55 g PPO-BR (4 meq/g), 14.5 ml THF, 2.5 ml NMP and 0.1% surfactant is prepared with different quantities of water, and bob cast as in Example 11. The results are given in Table 1 for single solutes and solute mixtures.

TABLE 1

(Effect of water content in casting solution on mosaic membrane performance in separate and mixed solutions.)

| Water (ml) | Evap. time (min) | separate solutions | | | mixed solution | | |
| --- | --- | --- | --- | --- | --- | --- | --- |
| | | % Rej (SO$_4$--) | % Rej (DNS) | Flux (1/m$^2$.d) | % Rej (SO$_4$--) | % Rej (DNS) | Flux (1/m$^2$.d) |
| 0.5 | 1.0 | 17.5 | 99.3 | 320 | 26.7 | 99.0 | 290 |
| 1.0 | 1.0 | 10.3 | 99.1 | 655 | 8.6 | 45.1 | 670 |

EXAMPLE 15

Example 14 is repeated with the addition of 0.2 g lactic acid to the casting solution formulation. The results for different water and evaporation times are given in Table 2. The results show the importance to adjust casting solution composition to get the maximum selectivity.

TABLE 2

| Water (ml) | Evap. time (min) | separate solutions | | | mixed solution | | |
| --- | --- | --- | --- | --- | --- | --- | --- |
| | | % Rej (SO$_4$−−) | % Rej (DNS) | Flux (l/m$^2$.d) | % Rej (SO$_4$−−) | % Rej (DNS) | Flux (l/m$^2$.d) |
| 0.5 | 2.0 | 29.8 | 99.6 | 230 | 8.1 | 97.0 | 225 |
| 1.0 | 1.0 | 6.7 | 99.3 | 480 | 13.3 | 97.8 | 490 |

EXAMPLE 16

In Example 5, 8 g PSU-SO$_3$H is the matrix material with 0.7 meq/g, while the 1.0 g of PSU-SO$_3$H has an IEC of 1.2 meq/g, and forms particles in the matrix. The total system is thus composed of low IEC-PSU-SO$_3$H, with particles of relatively high IEC-PSU-SO$_3$H and PPOBr.

In this example a different matrix is used based on polyetherimide (Ultem 100/GE ®), instead of the low 0.7 meq/g IEC sulfonated polysulfone. Example 5 is repeated using 5 g Ultem 100 instead of 8 g PSU-SO$_3$H, and the solvent mixture used contains 15 g NMP and 30 g THF. The resultant tubular membrane gives 94% rejection to DNS and 15% to sodium sulfate.

EXAMPLE 17

Example 12 is repeated using chloromethylated polyslfone instead of PPOBr. The rejection to DNS is 98% and 10% to sodium sulfate.

We claim:

1. A semipermeable mosaic polymer membrane with a macroscopic distribution of the mosaic-forming anionic and cationic charges which comprises an asymmetric structure of a matrix formed by at least one optionally charged polymer and at least one charged polymer dispersed therein.

2. The membrane according to claim 1, which comprises at least one optionally charged and matrix-forming polymer as major component and the at least one charged polymer dispersed therein as minor component.

3. The membrane according to claim 1, wherein at least one charged polymer is dispersed in the matrix-forming polymer of opposite charge.

4. The membrane according to claim 1, wherein polymers of both charges are dispersed in a neutral matrix-forming polymer or in a matrix-forming polymer of one or both charges.

5. The membrane according to claim 4, wherein the dispersed polymer contains cationic charges and the matrix-forming polymer contains anionic charges.

6. The membrane according to claim 1, wherein the charged polymers are in the form of distinct particles in the matrix structure.

7. The membrane according to claim 1, wherein the matrixforming polymers are polysulfones, polyether sulfones, polyetherketones, polyester-ether-ketones, polyether imides, polyphenylene oxides, polyphenylene sulfides, polyamides, polyimides, polyamide-imides, s, polyacrylonitriles, polyethers, polybenzimidazoles, cellulase or their derivatives.

8. The membrane according to claim 7, wherein the matrix-forming polymers are cellulose acetates, sulfonated polysulfones and polyether sulfones, or polyether imides, polyamides, polyimides, polycarbonates, or sulfonated 2,6-dimethylphenylene oxides.

9. The membrane according to claim 1, wherein the charged polymers dispersed in the maxtrix-structure are organic or inorganic polymers incompatible with the matrix-forming polymers.

10. The membrane according to claim 9, wherein the charged polymers are halomethylated polyphenylene oxides, polyether sulfones, polysulfones or polystyrenes, each quaternated with tertiary amines; sulfonated and/or carboxylated polystyrenes, polysulfones or polyether sulfones; or homo- or copolymers on the basis of polydimethyl siloxanes, containing groups that can be charged with amino or halogen compounds.

11. The membrane according to claim 10, wherein the charged polymers are halomethylated 2,6-polyphenylene oxides, polysulfones or polyethersulfones, quaternated with tertiary amines.

12. The membrane according to claim 7, wherein the matrix-forming polymer is a sulfonated polysulfone and the polymer dispersed therein is a halomethylated 2,6-polyphenylene oxide, quaternated with a tertiary amine.

13. The membrane according to claim 1, in flat or tubular form, optionally mounted on a support, preferably on a porous support.

* * * * *